W. F. COSGROVE,

Assignor to himself and E. F. JENNINGS; said COSGROVE and JENNINGS assignors, by mesne assignments, to THE J. K. TAYLOR COMPANY.

SMOKE STACK AND SPARK ARRESTER.

No. 10,013. Reissued Jan. 24, 1882.

Witnesses:
C. G. Keyes
Geo. J. Arnold

Inventor:
William F. Cosgrove
by his attorney,
A. S. Grewell.

N. PETERS, Photo-Lithographer, Washington, D. C.

UNITED STATES PATENT OFFICE.

WILLIAM F. COSGROVE, OF JERSEY CITY, N. J., ASSIGNOR TO HIMSELF AND ERNEST F. JENNINGS, OF SAME PLACE; SAID COSGROVE AND JENNINGS ASSIGNORS, BY MESNE ASSIGNMENTS, TO THE J. K. TAYLOR COMPANY, OF CONCORD, N. H.

SMOKE-STACK AND SPARK-ARRESTER.

SPECIFICATION forming part of Reissued Letters Patent No. 10,013, dated January 24, 1882.

Original No. 218,937, dated August 26, 1879. Application for reissue filed December 5, 1881.

*To all whom it may concern:*

Be it known that I, WILLIAM F. COSGROVE, of Jersey City, Hudson county, New Jersey, have invented certain new and useful Improvements in Smoke-Stacks and Spark-Arresters; and I do hereby declare that the same are fully described in the following specification, and illustrated in the accompanying drawings.

This invention relates specifically to spark-arresters and smoke-stacks attached to steam-generators—such as locomotives and boilers—where it is desirable to arrest the sparks, dust, and cinders carried out by the draft.

The object of the invention is to provide a smoke-stack of improved construction, in which the jacket and the deflectors mounted in the double conical head of the jacket are supported upon a flanged lower section of the stack, from which the petticoat-pipe depends, and also to furnish a chamber formed in an extension of the boiler-shell forward of the stack, for carrying the cinders and other products of the fire deflected from the stack and conveyed to said chamber through a tube.

My invention consists in the devices and combinations of devices set forth in the appended claims.

Figure 1:
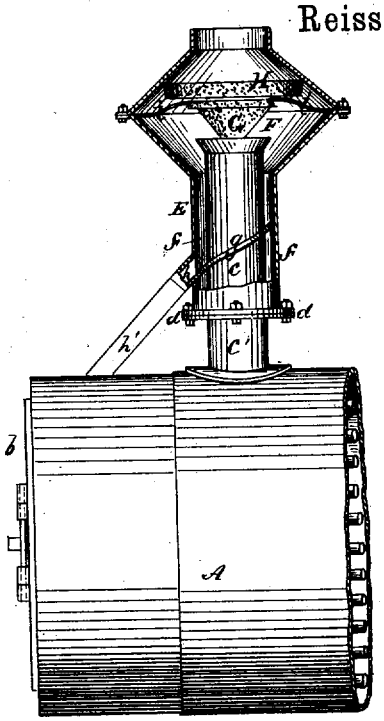
Figure 2:
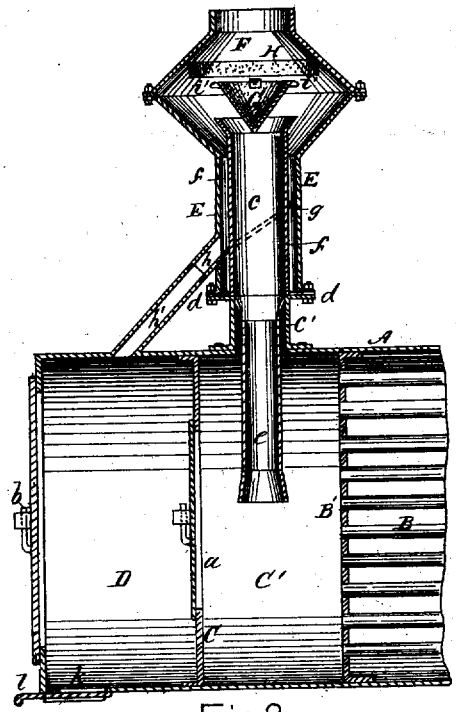

In the accompanying drawings, Figure 1 is a side elevation of part of a boiler provided with my improvements, the jacket being shown in section; and Fig. 2 is a vertical longitudinal section thereof.

A represents the boiler-shell, B B the flues, and B′ the flue-plate. C is the boiler-head, in which is a man-hole, *a*. C′ is the smoke arch or chamber between the flue-plate and the boiler-head C.

Forward of the boiler-head is a spark-chamber, D, the cylindrical wall of which is coincident with or formed by an extension of the boiler-shell, so that a uniform external appearance is preserved. The drawings indicate this extension in Fig. 2 as an absolutely integral prolongation of the shell itself, and in Fig. 1 as a cylinder of like form and proportions practically integral with the shell. The front end of the chamber D is also represented as having a central opening in it, closed by a door, *b*. With this arrangement the prolonged boiler-shell surrounds both the chambers C′ and D, and the boiler-head proper forms the front wall of the former and the rear wall of the latter, constituting a solid and impervious partition between them.

From the upper side of the boiler, over the smoke-chamber, rises the smoke-stack, formed of two parts, *c c′*, connected together by a broad flange, *d*. The petticoat-pipe *e* depends from the stack into the chamber C′ to receive the exhaust-steam from the engine, and the smoke, cinders, &c., are thereby carried by the draft through the stack *c c′*.

Surrounding the upper part, *c*, of the smoke-stack is a jacket, E, the bottom of which is flanged outwardly and bolted to the flange *d* by the same bolts that fasten the two parts of the stack together. The top of the jacket is provided with a double conical head, F.

G represents a perforated cone having a curved flanged base, and held in an inverted position over the flaring top of the stack by arms *i*, extending from the walls of the head inwardly, so as to hold the cone G with its apex directly in line with the axis of the stack.

From the walls of the upper cone of the head F depends a perforated screen, H, so as to leave an annular space between its edge and the base of the inverted cone G. This space should be of the same capacity for the passage of air and smoke as the stack, so that no obstruction will be offered to the draft. It is for this purpose that the screen and cone are perforated. The perforated cone and screen form the spark-arresters proper.

Between the stack and the jacket E is an annular space, *f*, in which is a collar, *g*, placed in an inclined position, so as to lead the sparks, cinders, &c., falling upon it to the spout *h*, projecting obliquely from the front of the stack. From this spout a pipe, *h′*, leads through the prolongation of the boiler-shell over the spark-chamber D.

The operation of the apparatus is as follows: The draft carries the dust, cinders, and sparks up the stack, and, striking against the sides of the inverted cone, they are deflected to the walls of the double conical head, whence the greater part falls down between the jacket and the stack to the collar *g*. Those particles having great momentum or being very light, if carried farther up, come in contact with the dependent screen H and are stopped, whence they too fall to the collar. This being inclined so as to lead to the spout *h*, the cinders, dust, &c., accumulating fall down through spout *h* into pipe *h'*, and are thence delivered into chamber D, from whence they can be removed through the opening *k* in the bottom of chamber D, covered by sliding door *l*.

I am aware that conical and horizontal deflectors have heretofore been known, and also that rectangular boxes distinct from the boiler have been provided to receive the deflected matter; that pipes have been furnished for discharging such matter into the open air or onto the ground from the stack direct, and that a perforated screen extending across the smoke-chamber in rear of the stack has been used to exclude the larger cinders from the stack, although interfering seriously with the draft. Hence I do not claim such apparatus; but

I claim as of my invention—

1. The stack made in two parts, *c c'*, united at the flange *d*, and the petticoat-pipe *e*, depending from the part *c'*, in combination with the jacket E, mounted on the flange *d*, and supporting in its head the arresting and deflecting devices, for the purpose set forth.

2. The chamber D, formed as an integral extension of the boiler-shell A, but distinct from the smoke arch C', and arranged to receive the sparks, dust, and cinders deflected downward in the stack, substantially as set forth.

3. The chambers C' D of the boiler A, separated by the solid or impervious partition C, and arranged with relation to the smoke-stack, deflectors, and conveying-tube substantially as set forth.

4. The boiler A, having forward of the smoke-arch C' a chamber, D, the cylindrical walls of which are coincident or integral with the boiler-shell, in combination with suitable means of arresting the cinders and sparks carried upward by the draft, and an oblique pipe to convey them to said chamber, substantially as set forth.

WILLIAM F. COSGROVE.

Witnesses:
WILTON T. JENNINGS,
ALFRED HAYNES.